United States Patent
Fukada

(10) Patent No.: US 9,246,682 B2
(45) Date of Patent: Jan. 26, 2016

(54) COMMUNICATION APPARATUS, METHOD FOR CONTROLLING COMMUNICATION APPARATUS, AND PROGRAM

(71) Applicant: CANON KABUSHIKI KAISHA, Tokyo (JP)

(72) Inventor: Masanori Fukada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/158,596

(22) Filed: Jan. 17, 2014

(65) Prior Publication Data

US 2014/0208115 A1 Jul. 24, 2014

(30) Foreign Application Priority Data

Jan. 21, 2013 (JP) .................................. 2013-008621

(51) Int. Cl.
*H04L 9/32* (2006.01)
*H04L 9/08* (2006.01)

(52) U.S. Cl.
CPC ............... *H04L 9/0891* (2013.01); *H04L 9/32* (2013.01)

(58) Field of Classification Search
CPC .............................. H04L 9/0891; H04L 9/32
USPC ................ 713/171, 168, 193; 380/277; 726/6
See application file for complete search history.

(56) References Cited

U.S. PATENT DOCUMENTS

| 8,108,674 | B2* | 1/2012 | Takeda ........................ 713/168 |
| 8,510,844 | B2* | 8/2013 | Takatsuji et al. ................ 726/26 |
| 2008/0046730 | A1* | 2/2008 | Han et al. ...................... 713/171 |
| 2009/0063861 | A1* | 3/2009 | Chu .................... H04L 63/0442 713/171 |
| 2012/0017086 | A1* | 1/2012 | Chu ...................... H04L 9/0825 713/171 |
| 2014/0059356 | A1* | 2/2014 | Nesnow ................ G06F 21/602 713/189 |

FOREIGN PATENT DOCUMENTS

JP          2006-352500 A     12/2006

* cited by examiner

*Primary Examiner* — Samson Lemma
(74) *Attorney, Agent, or Firm* — Canon USA, Inc. IP Division

(57) ABSTRACT

A communication apparatus includes a storage unit, an updating unit, a determination unit, and a deletion unit. The storage unit stores, in a storage, a first key used to decrypt or authenticate a packet to be communicated between the communication apparatus and a second communication apparatus. The updating unit updates the first key to a second key different from the first key when an expiration date of the first key has passed. The determination unit determines that a packet to be decrypted or authenticated using the second key has been received from the second communication apparatus. The deletion unit deletes the first key from the storage unit in response to the determination unit determining that the packet to be decrypted or authenticated using the second key has been received from the second communication apparatus.

21 Claims, 11 Drawing Sheets

COMMUNICATION APPARATUS, METHOD FOR CONTROLLING COMMUNICATION APPARATUS, AND PROGRAM

BACKGROUND OF THE INVENTION

1. Field of the Invention

The present invention relates to a communication apparatus that updates a key used to decrypt or authenticate a packet to be communicated between the communication apparatus and another communication apparatus.

2. Description of the Related Art

In recent years, the necessity of ensuring security in sending and receiving of data via a network has increased. A protocol for ensuring security of an Internet Protocol (IP) packet flowing on an IP network includes an IP Security Protocol (IPSec) (see Japanese Patent Application Laid-Open No. 2006-352500).

An encryption key and an authentication key used in the IPSec are managed as a Security Association (SA). A packet conforming to the IPSec is encrypted, decrypted, and authenticated using an encryption key and authentication key managed as the SA.

The SA is periodically updated from an old SA to a new SA at each software expiration date (update date). On the other hand, the old SA used before the updating is retained until an instruction to delete the SA is received from a communication partner or a hardware expiration date (deletion date) passes. The hardware expiration date is provided to reduce the possibility that the packet is unsuccessfully received even if a packet using the old SA is delivered late or it takes time for the communication partner to shift from the old SA to the new SA.

When the instruction to delete the SA from the communication partner disappears in the network, however, a communication apparatus cannot receive the deletion instruction so that the SA cannot be deleted until the hardware expiration date passes.

A user can set any value as the hardware expiration date. Thus, the old SA may remain in a memory without being deleted for a long time after being updated.

When the old SA remains in the memory for a long time without being deleted, a memory space is compressed. Further, a processing load when the SA is searched for increases.

SUMMARY OF THE INVENTION

According to an aspect of the present invention, a communication apparatus includes a storage unit configured to store, in a storage, a first key used to decrypt or authenticate a packet to be communicated between the communication apparatus and a second communication apparatus, an updating unit configured to update the first key to a second key different from the first key when an expiration date of the first key has passed, a determination unit configured to determine that a packet to be decrypted or authenticated using the second key has been received from the second communication apparatus, and a deletion unit configured to delete the first key from the storage unit in response to the determination unit determining that the packet to be decrypted or authenticated using the second key has been received from the second communication apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In a first exemplary embodiment, a case where a communication apparatus 101 communicates a data packet (hereinafter referred to as a packet), which has been encrypted using a Security Architecture for InternetProtocol (IPSec), with another communication apparatus (not illustrated) will be described.

Figure 1:
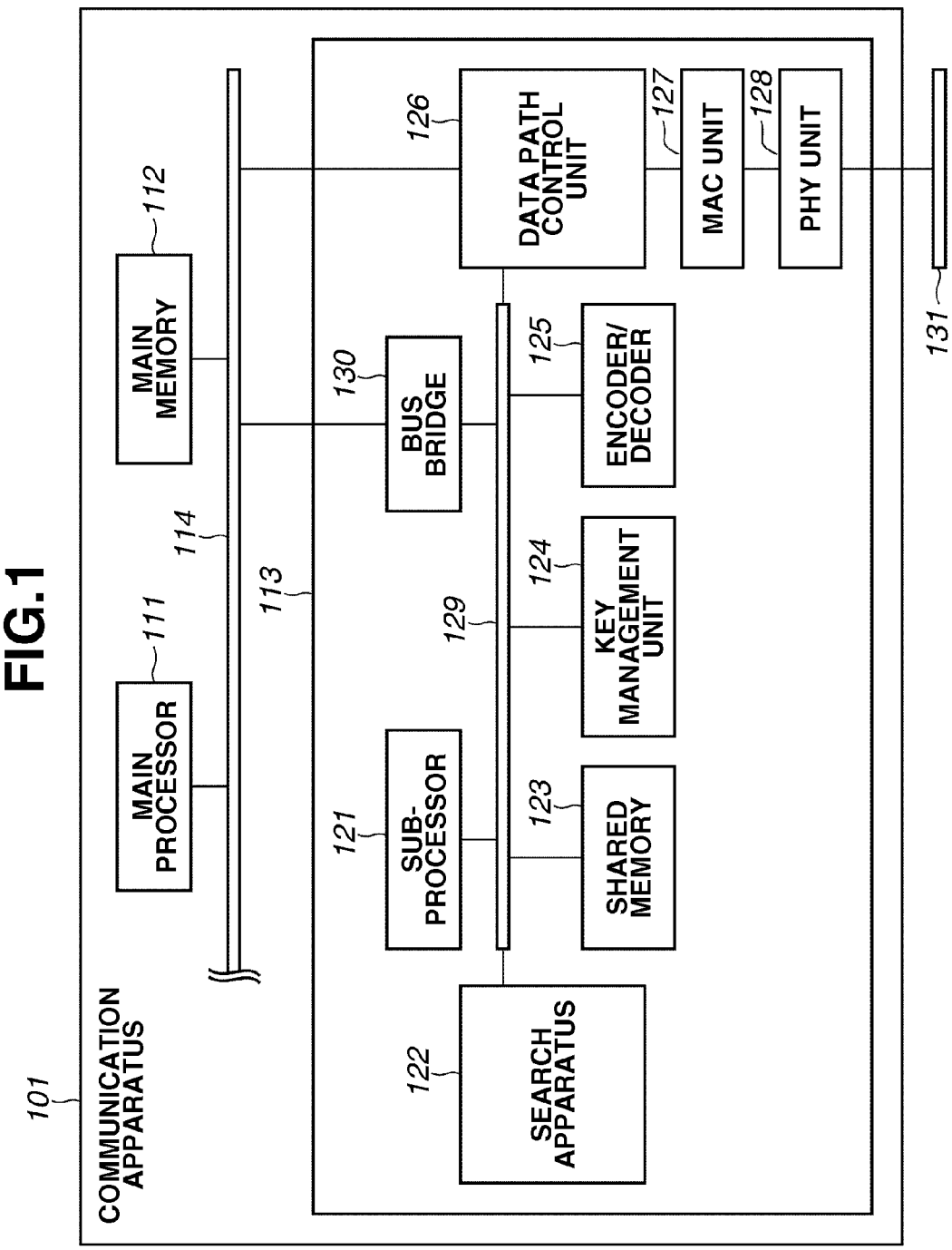
FIG. 1 illustrates a hardware configuration of a communication apparatus according to a first exemplary embodiment.

FIG. 1 illustrates a hardware configuration of the communication apparatus 101. A main processor 111 performs processing for application such as display (including projection) and printing of data. The main processor 111 instructs a sub-processor 121, described below, to send data to another communication apparatus (not illustrated). A main memory 112 stores data used for the application processing, various parameters used for data communication with another communication apparatus, and a program for implementing various flowcharts, described below. A Transmission Control Protocol/Internet Protocol (TCP/IP) Offload Engine (TOE) 113 performs protocol processing for performing data communication with another communication apparatus. The main processor 111, the main memory 112, and the TOE 113 are connected to one another via a bus 114.

An internal configuration of the TOE 113 will be described below. The sub-processor 121 performs various types of protocol processing for data communication with another communication apparatus. A search apparatus 122 searches a shared memory 123 for various types of information required for data communication with another communication apparatus. An operation of the search apparatus 122 will be described below.

The shared memory 123 stores various types of information required for data communication with another communication apparatus and data to be communicated. A key management unit 124 manages an encryption key used for data communication with another communication apparatus. The encryption key is stored in the shared memory 123. An encoder/decoder 125 encrypts and decrypts data for communication with another communication apparatus using the encryption key managed by the key management unit 124.

A data path control unit 126 controls data transfer (Direct Memory Access (DMA) transfer) between the shared memory 123 and a Media Access Control (MAC) unit 127. The MAC unit 127 performs protocol processing of an MAC layer corresponding to a lower sublayer in a data link layer (second layer) of an Open Systems Interconnection (OSI) reference model. A physical layer (PHY) unit 128 performs protocol processing of a PHY layer placed in a first layer of the OSI reference model and processing of an electrical signal.

A bus 129 connects various types of hardware devices within the TOE 113. A bus bridge 130 connects the bus 114 and the bus 129. A network 131 connects the communication apparatus 101 and another communication apparatus (not illustrated). The network 131 may be wired or wireless.

Figure 2:
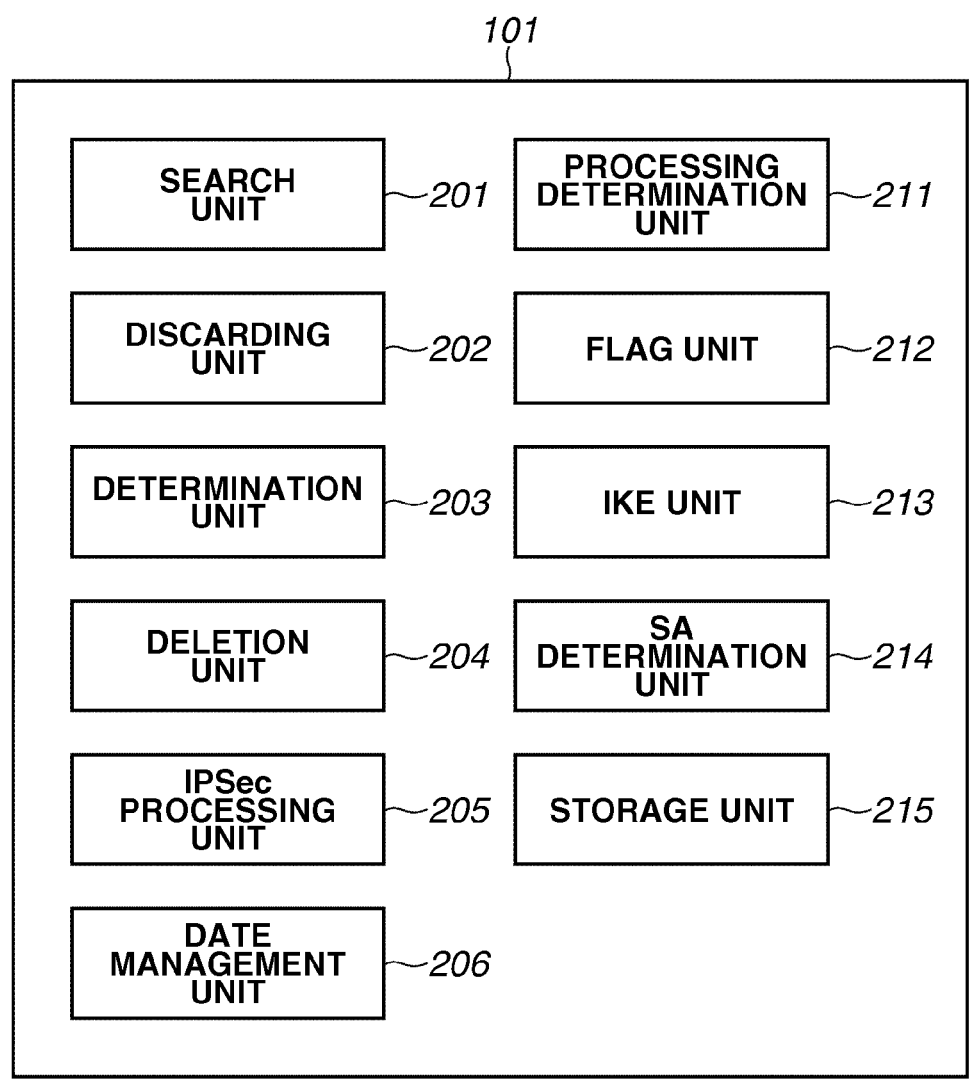
FIG. 2 is a block diagram of software of the communication apparatus.

FIG. 2 illustrates software blocks implemented when the main processor 111 or the sub-processor 121 reads out the program stored in the main memory 112. A plurality of software blocks illustrated in FIG. 2 may be configured as one software block. Alternatively, one software block may be configured as a plurality of software blocks. Alternatively, some or all of the software blocks illustrated in FIG. 2 may be configured as hardware.

A search unit 201 searches for an SA corresponding to a packet (a transmitted packet or a received packet). The search unit 201 searches the shared memory 123 for the corresponding SA using an IP address and a port number of another communication apparatus serving as a sending source of the received packet, an IP address and a port number of the communication apparatus 101 itself, a protocol type, and a Security Pointer Index (SPI) as search keys. The protocol type is information indicating whether communication conforming to a TCP is being performed with another communication apparatus or whether communication conforming to a User Datagram Protocol (UDP) is being performed. The SPI is information for identifying an encryption key and an authentication key used in the SA. In the SA, encryption communication parameters such as an encryption key and an encryption algorithm and an authentication key and an authentication algorithm used in encryption communication with another communication apparatus are managed. However, the SA may not include information about the encryption key and the encryption algorithm, or may not include information about the authentication key and the authentication algorithm.

A discarding unit 202 discards the packet (the transmitted packet or the received packet). A determination unit 203 determines whether information about an old SA is associated with the SA detected by the search unit 201. Description of the old SA will be described below. A deletion unit 204 deletes the SA from the shared memory 123.

An IPSec processing unit 205 subjects the received packet to predetermined IPSec processing. More specifically, the IPSec processing unit 205 decrypts the received packet according to the encryption key and the encryption algorithm managed in the corresponding SA. Further, the IPSec processing unit 205 authenticates the received packet according to the authentication key and the authentication algorithm managed in the corresponding SA. Therefore, if the received packet has unsuccessfully been decrypted or if the received packet has unsuccessfully been authenticated, the discarding unit 202 discards the received packet. Alternatively, only either one of the decryption and the authentication may be performed.

Further, the IPSec processing unit 205 encrypts the transmitted packet according to the encryption key and the encryption algorithm managed in the corresponding SA. The IPSec processing unit 205 generates authentication information of the transmitted packet according to the authentication key and the authentication algorithm managed in the corresponding SA, and adds the generated authentication information to the transmitted packet. Alternatively, only either one of the encryption and the addition of the authentication information may be performed.

A date management unit 206 determines whether a software expiration date (update date) and a hardware expiration date (update date) of the corresponding SA have passed. The software expiration date and the hardware expiration date are respectively predetermined values previously determined in the communication apparatus 101. However, instead of these dates, the expiration dates may be predetermined values previously determined in another communication apparatus serving as a communication partner of the communication apparatus 101. The smaller one or the larger one among the values determined in the communication apparatus 101 and another communication apparatus may be used as the expiration date.

A processing determination unit 211 determines whether request processing for a new SA is already been performed. A flag unit 212 manages a flag indicating that the request processing for the new SA is already been performed. An Internet Key Exchange (IKE) unit 213 performs processing for acquiring the new SA by working with another communication apparatus according to an IKE protocol. An SA determination unit 214 determines whether an old SA corresponding to the new SA, i.e., whether the SA having passed a software expiration date is stored in the shared memory 123. A storage unit 215 stores the SA newly acquired by the IKE unit 213 in the shared memory 123.

Figure 3:
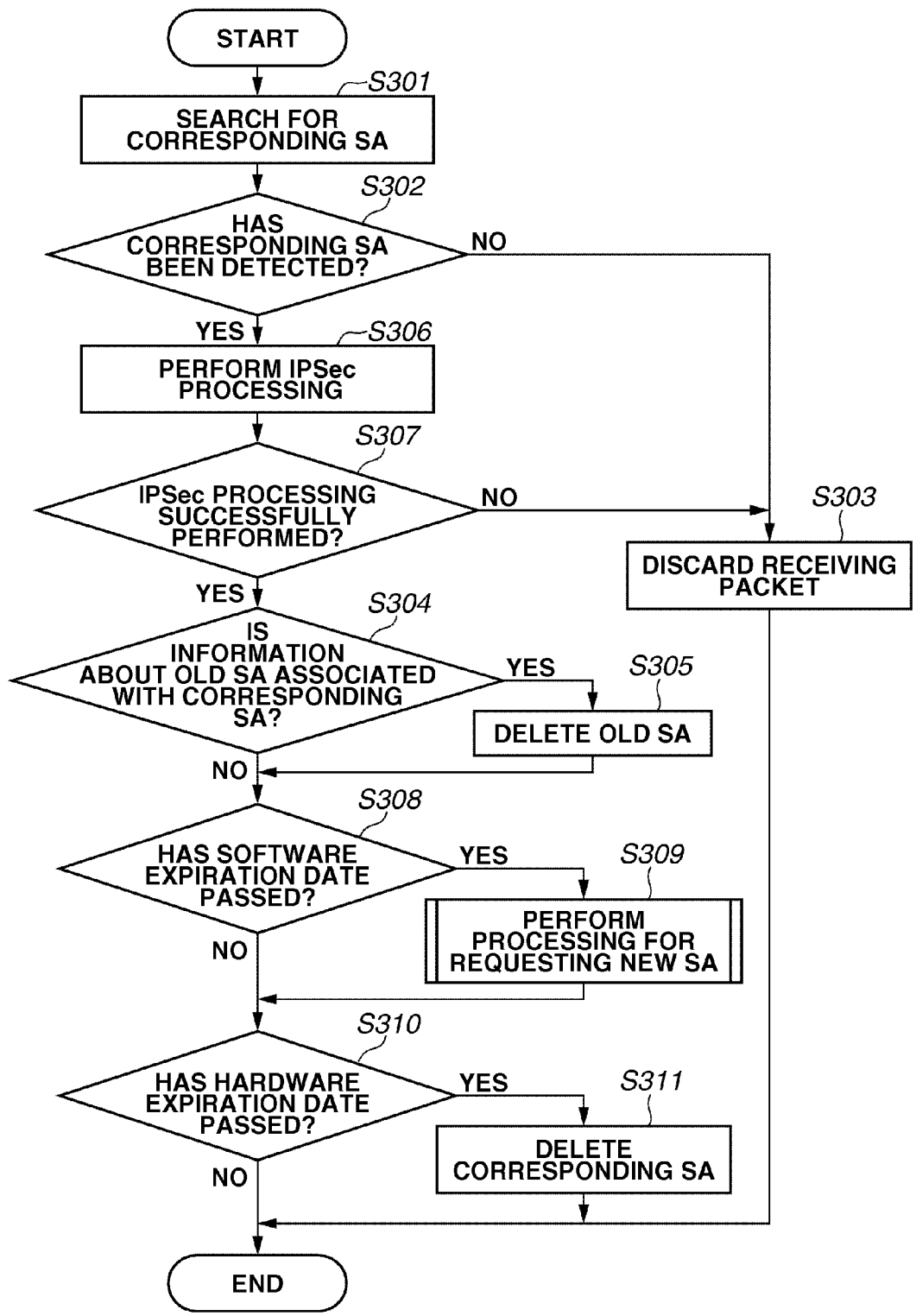
FIG. 3 is a flowchart implemented by the communication apparatus.

FIG. 3 is a flowchart implemented when the main processor 111 or the sub-processor 121 reads out a program stored in the main memory 112 if the communication apparatus 101 receives a packet conforming to an IPSec from another communication apparatus (not illustrated).

In step S301, the search unit 201 first searches for an SA corresponding to a packet received from another communication apparatus (hereinafter referred to as a received packet). In the search, the search unit 201 distinguishes between a new SA and an old SA by referring to an SPI. More specifically, it can be determined whether a packet to be decrypted and authenticated using an encryption key and an authentication key managed in the new SA has been received or whether a packet to be decrypted and authenticated using an encryption key and an authentication key managed in the old SA has been received. Alternatively, the search unit 201 may carry out search by handling the SA as a new SA if the received packet has successfully been decrypted and authenticated using the encryption key and the authentication key managed by the new SA, or by handling the SA as an old SA if the received packet has successfully been decrypted and authenticated using the encryption key and the authentication key managed in the old SA.

In step S302, the search unit 201 determines whether the corresponding SA has been detected. If the corresponding SA has not been detected (NO in step S302), then in step S303, the discarding unit 202 discards the received packet. On the other hand, if the corresponding SA has been detected (YES in step S302), then in step S304, the determination unit 203 determines whether information about the old SA is associated with the detected corresponding SA.

If the information about the old SA is not associated (NO in step S304), the processing proceeds to step S306. On the other hand, if the information about the old SA is associated (YES in step S304), then in step S305, the deletion unit 204 deletes the old SA from the shared memory 123, and the processing proceeds to step S306.

In step S306, the IPSec processing unit 205 subjects the received packet to predetermined IPSec processing. In step S307, the IPSec processing unit 205 determines whether the IPSec processing has successfully been performed. More specifically, the IPSec processing unit 205 decrypts the received packet according to the encryption key and the encryption algorithm managed in the corresponding SA. Further, the IPSec processing unit 205 authenticates the received packet according to the authentication key and the authentication algorithm managed in the corresponding SA. If the received packet has successfully been decrypted and if the received packet has successfully been authenticated (YES in step S307), the processing proceeds to step S308. If the received packet has unsuccessfully been decrypted or if the received packet has unsuccessfully been authenticated (NO in step S307), then in step S303, the discarding unit 202 discards the received packet. Alternatively, only either one of the decryption and the authentication may be performed.

In step S308, the date management unit 206 then determines whether a software expiration date (update date) of the corresponding SA has passed. If the software expiration date has passed (YES in step S308), then in step S309, processing for updating the corresponding SA is performed. More specifically, processing for requesting a new SA is performed. The request processing will be described below.

The expiration date may be set by time, or may be set by bytes. If the expiration date is set by time, a timer measures a time that has elapsed since an SA was acquired, and it is determined that the expiration date has passed if a time longer than the expiration date previously set is measured. If the expiration date is set in bytes, the number of bytes of a packet communicated using the SA is accumulated. When the number of bytes has reached the predetermined number, it is determined that the expiration date has passed.

In step S310, the date management unit 206 then determines whether a hardware expiration date (deletion date) of the corresponding SA has passed. If the hardware expiration date has passed (YES in step S310), then in step S311, the deletion unit 204 deletes the corresponding SA from the shared memory 123.

Figure 4:
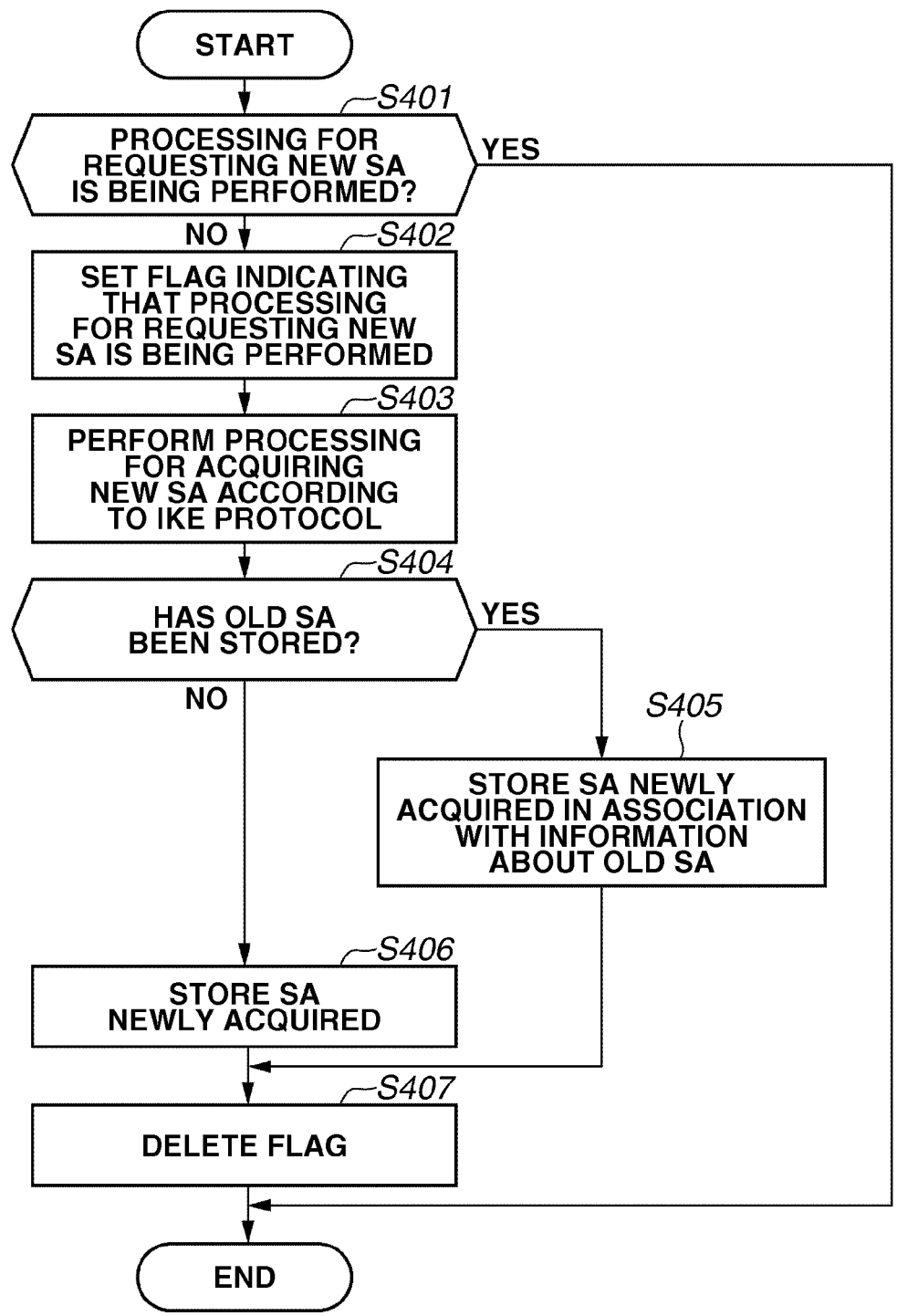
FIG. 4 is a flowchart implemented by the communication apparatus.

The SA request processing performed in step S309 will be described below with reference to FIG. 4.

In step S401, the processing determination unit 211 determines whether processing for requesting a new SA which substitutes for an SA having passed a software expiration date, is already being performed. If the request processing is being performed (YES in step S401), the processing illustrated in FIG. 4 ends. On the other hand, if the request processing is not being performed (NO in step S401), then in step S402, the flag unit 212 sets a flag indicating that the processing for requesting the new SA is already being performed. In this case, a temporary SA is stored as the flag in the shared memory 123. The determination in step S401 is made depending on whether the temporary SA is stored in the shared memory 123.

In step S403, the IKE unit 213 performs processing for acquiring the new SA according to a predetermined protocol by working with another communication apparatus. If the IKE unit 213 acquires the new SA, then in step S404, the SA determination unit 214 determines whether an old SA corresponding to the new SA, i.e., whether the SA having passed the software expiration date is stored in the shared memory 123. If the old SA has been stored (YES in step S404), then in step S405, the storage unit 215 stores the SA, which has newly been acquired in step S403, in the shared memory 123 by associating information about the old SA therewith. If the old SA is not stored (NO in step S404), then in step S406, the storage unit 215 stores the SA, which has newly been acquired in step S403, in the shared memory 123. In this case, an old SA corresponding to the newly acquired SA does not exist, so that association is not performed.

In step S407, the flag unit 212 then deletes a flag indicating that the processing for requesting the new SA is already being performed. In this case, the temporary SA stored in the shared memory 123 is deleted.

Thus, the new SA and the old SA are associated with each other and are stored in the shared memory 123, and are used to make the determination in step S304 illustrated in FIG. 3.

Figure 5:
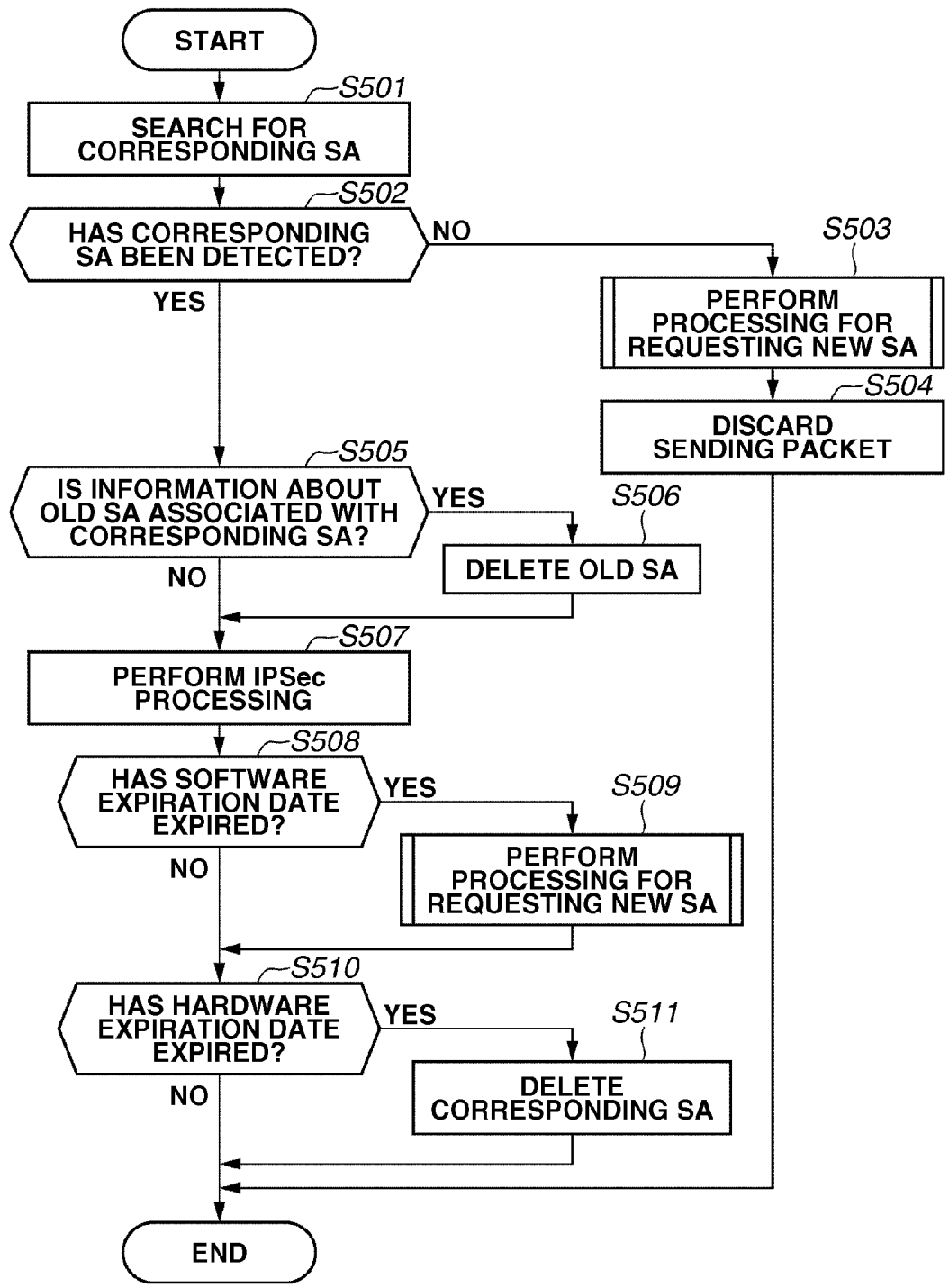
FIG. 5 is a flowchart implemented by the communication apparatus.

FIG. 5 is a flowchart implemented by the main processor 111 or the sub-processor 121 reading out a program stored in the main memory 112 when the communication apparatus 101 sends a packet conforming to an IPSec to another communication apparatus (not illustrated).

In step S501, the search unit 201 first searches for an SA corresponding to a packet to be sent to another communication apparatus (hereinafter referred to as a transmitted packet).

In step S502, the search unit 201 determines whether the corresponding SA has been detected. If the corresponding SA has not been detected (NO in step S502), then in step S503, processing for requesting a new SA illustrated in FIG. 4 is performed. In step S504, the discarding unit 202 further discards the transmitted packet and the processing illustrated in FIG. 5 ends.

On the other hand, if the corresponding SA has been detected (YES in step S502), then in step S505, the determination unit 203 determines whether information about an old SA is associated with the detected corresponding SA. If the information about the old SA is not associated (NO in step S505), the processing proceeds to step S507. On the other hand, if the information about the old SA is associated (YES in step S505), then in step S506, the deletion unit 204 deletes the old SA from the shared memory 123, and the processing proceeds to step S507.

In step S507, the IPSec processing unit 205 subjects the transmitted packet to predetermined IPSec processing. More specifically, the IPSec processing unit 205 encrypts the transmitted packet according to an encryption key and an encryption algorithm managed in the corresponding SA. The IPSec processing unit 205 generates authentication information about the transmitted packet according to an authentication key and an authentication algorithm managed in the corresponding SA, and adds the generated authentication information to the transmitted packet. Alternatively, only either one of the encryption and the addition of the authentication information may be performed.

In step S508, the date management unit 206 then determines whether a software expiration date (update date) of the corresponding SA has passed. If the software expiration date has passed (YES in step S508), then in step S509, processing for updating the corresponding SA is performed. More specifically, processing for requesting a new SA is performed.

In step S510, the date management unit 206 then determines whether a hardware expiration date (deletion date) of the corresponding SA has passed. If the hardware expiration date has passed (YES in step S510), then in step S511, the deletion unit 204 deletes the corresponding SA from the shared memory 123.

Thus, a new SA corresponding to the old SA having passed the software expiration date is stored in the storage unit 215 until a packet using the new SA is received from another communication apparatus after the new SA is acquired. Even if a packet using the old SA is received from another communication apparatus after the new SA is acquired, therefore, the packet using the new SA can normally be received. More specifically, the possibility that the packet is lost can be reduced even if it takes time for another communication apparatus to switch from packet transmission using the old SA to packet transmission using the new SA.

In the above-mentioned exemplary embodiment, when the packet corresponding to the IPSec is sent, it is determined whether an old SA associated with an SA to be used for transmitting the packet exists. If the old SA exists, the old SA is deleted. However, the feasible processing is not limited to the above, but in response to the communication apparatus 101 acquiring a new SA to be used during the transmission, an old SA corresponding to the new SA may be deleted. Thus, the old SA can be quickly deleted so that a memory can be more effectively used.

A second exemplary embodiment will be described below. A hardware configuration of a communication apparatus 101 is similar to that in the first exemplary embodiment.

Figure 6:
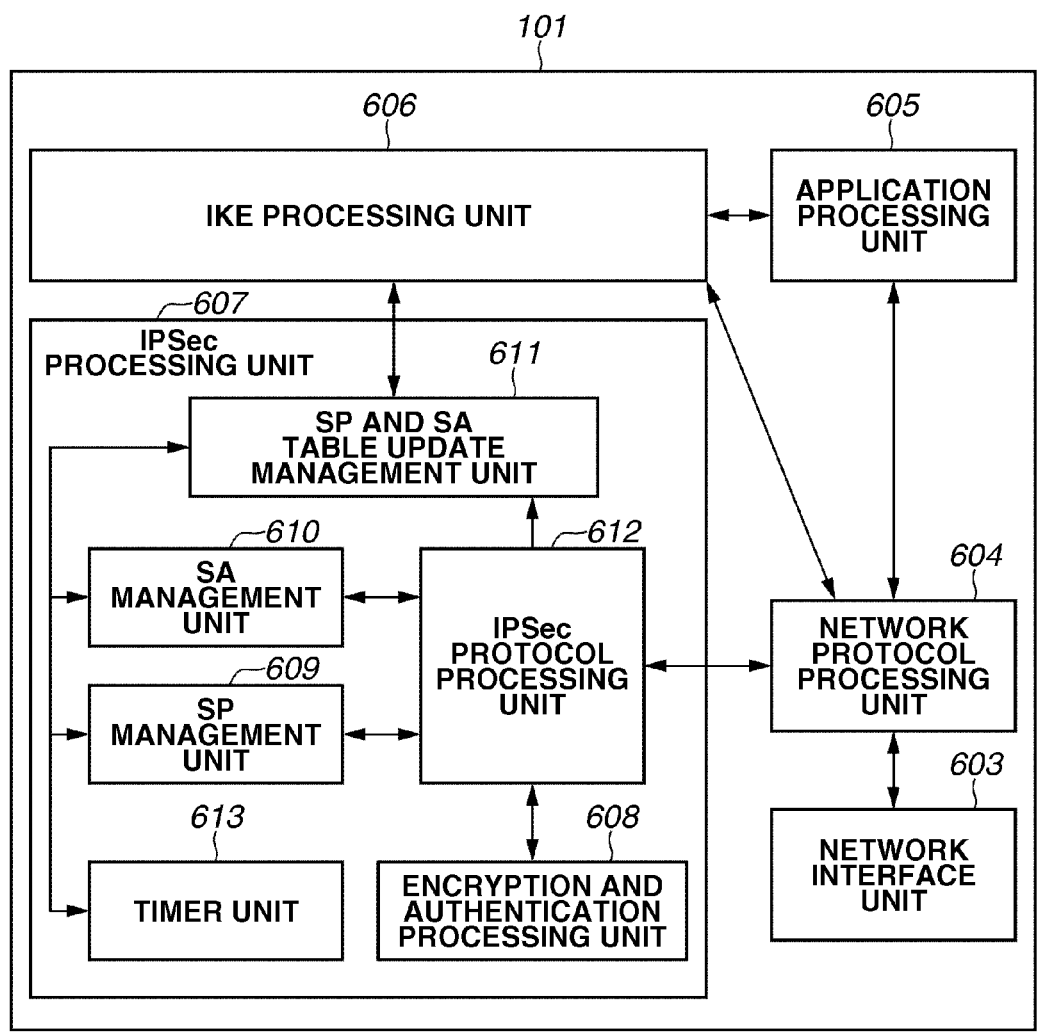
FIG. 6 is a block diagram of software of a communication apparatus according to a second exemplary embodiment.

FIG. 6 illustrates software blocks implemented when a main processor 111 or a sub-processor 121 reads out a program stored in a main memory 112. A plurality of software blocks illustrated in FIG. 6 may be configured as one software block. Alternatively, one software block may be configured as a plurality of software blocks. Further, some or all of the software blocks illustrated in FIG. 6 may be configured as hardware.

A network protocol processing unit 604 processes a network protocol such as TCP, UDP, or IP. The network protocol processing unit 604 performs MAC and IP protocol processing on a packet that has been received via a network interface unit 603. An IPSec processing unit 607 performs IPSec receiving processing on the packet. When the IPSec processing unit 607 has completed the IPSec receiving processing, the network protocol processing unit 604 processes a network protocol such as TCP or UDP again. Then, an application processing unit 605 performs processing of an application on the packet. If the packet is an IKE packet, an IKE processing unit 606 performs IKE processing on the packet.

The application processing unit 605 and the IKE processing unit 606 issue a sending request to the network protocol processing unit 604 if they send the packet to a communication partner. The network protocol processing unit 604 processes a network protocol such as TCP, UDP, or IP. The IPSec processing unit 607 then performs IPSec processing on the packet. The network protocol processing unit 604 performs IP and MAC processing on the packet, and sends the packet via the network interface unit 603.

An IPSec protocol processing unit 612 performs IPSec protocol processing in sending or receiving of the packet, and processes an IPSec protocol such as Encapsulated Security Payload (ESP) or Authentication Header (AH). The IPSet protocol processing unit 612 issues a request to search for a Service Policy (SP) registered in an SP management unit 609 to specify a policy of the sent or received packet.

The IPSec protocol processing unit 612 requests an SA management unit 610 to search for a registered SA to specify an SA required in encryption and authentication processing. In addition, the IPSec protocol processing unit 612 counts an expiration date in bytes, and requests the SA management unit 610 to update the counting of the expiration date. An encryption and authentication processing unit 608 performs encryption and authentication processing based on an encryption algorithm, an encryption key, an authentication algorithm, and an authentication key of the SA. An SP and SA table update management unit 611 controls processing for registering, updating, deleting, and referring to the SP and the SA from the IKE processing unit 606, and issues a processing request to the SA management unit 610 and the SP management unit 609. If the IPSec protocol processing unit 612 determines that no relevant SA has been found as a result of issuing an SA search request to the SA management unit 610 when the packet is sent, the SP and SA table management unit 611 receives an SA negotiation request from the IPSec protocol processing unit 612, and notifies the IKE processing unit 606 of the received SA negotiation request. The SP and SA table update management unit 611 receives the SA negotiation request upon receiving a notification that a software expiration date has passed, and notifies the IKE processing unit 606 of the received SA negotiation request. A timer unit 613 notifies that a period of time designated by the setting from the SA management unit 610 and the SP and SA table update management unit 611 has elapsed. The SA management unit 610 retains a Security Association Database (SAD), performs an operation on the SAD based on requested processing, and returns a processing result. The SP management unit 609 retains a Security Policy Database (SPD), performs an operation on the SPD based on requested processing, and returns a processing result.

The SAD is a database for managing and retaining an SA. The SPD is a database for managing and retaining an SP.

Figure 7:
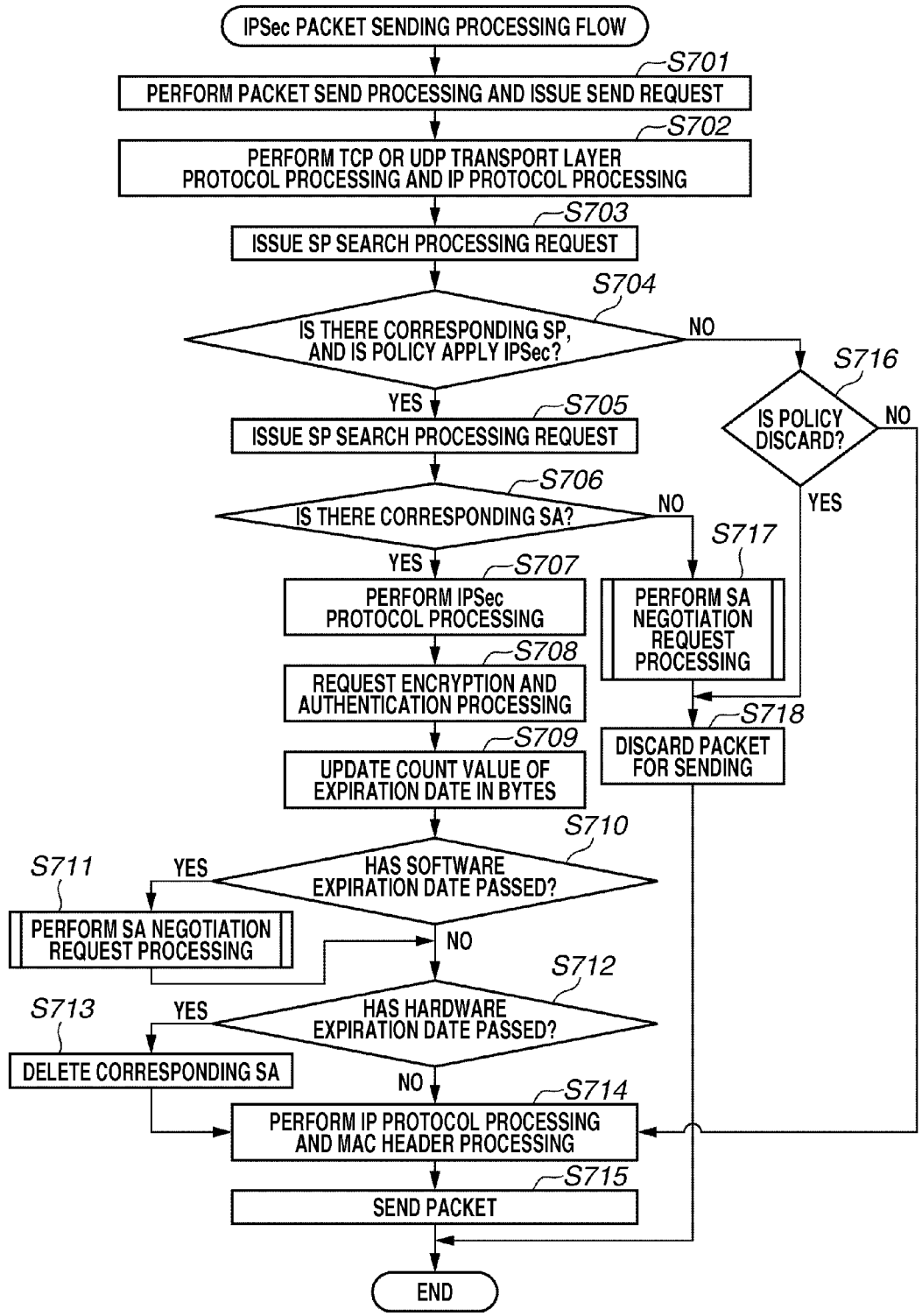
FIG. 7 is a flowchart implemented by the communication apparatus.

An IPSec packet sending processing flow in the communication apparatus 101 will be described below with reference to FIG. 7. In step S701, the application processing unit 605 performs processing for sending a packet to a communication partner, and issues a sending request to the network protocol processing unit 604. The application processing unit 605 issues a sending request to the network protocol processing unit 604 from the IKE processing unit 606 when the IKE processing unit 606 sends an IKE packet.

In step S702, the network protocol processing unit 604 receives a request to send data from the application processing unit 605. Upon receipt of the request, the network protocol processing unit 604 processes a transport layer protocol such as TCP or UDP, which has been designated by the application processing unit 605, and processes an IP. The network protocol processing unit 604 then notifies the IPSec processing unit 607 of a generated IP packet.

In step S703, the IPSec processing unit 607 receives the IP packet to be sent. Then, the IPSec protocol processing unit 612 issues an SP search processing request to the SP management unit 609 based on packet information such as an IP address, a transport layer protocol type, and a port number of the IP packet. The SP management unit 609, which has received the SP search processing request, conducts a search to check whether an SP corresponding to the designated packet information has been registered in the SPD, and notifies the IPSec protocol processing unit 612 of a search result.

In step S704, the IPSec protocol processing unit 612 makes a judgment on the search result that has been notified from the SP management unit 609, and determines whether there is an SP corresponding to the designated packet information. If there is a corresponding SP, and the policy is Apply IPSec (YES in step S704), the processing proceeds to step S705. If there is no corresponding SP or if the policy is other than Apply IPSec (NO in step S704), the processing proceeds to step S716.

If the SP has not been found (NO in step S704), then in step S716, the IPSec protocol processing unit 612 confirms a policy of an encryption communication processing apparatus, and determines whether the policy is Discard. If the policy is Discard (YES in step S716), then in step S718, the IPSec protocol processing unit 612 discards the packet, and the processing ends. If the policy is Bypass IPSec (NO in step S716), the processing proceeds to step S714. If the SP has been found in step S704, the IPSec protocol processing unit 612 confirms a policy of the SP. If the policy is other than Apply IPSec (NO in step S704), then in step S716, the IPSec protocol processing unit 612 determines whether the policy is Discard. If the policy is Discard (YES in step S716), then in step S718, the IPSec protocol processing unit 612 discards the packet, and the processing ends. If the policy is Bypass IPSec (NO in step S716), the processing proceeds to step S714.

In step S705, the IPSec protocol processing unit 612 issues an SA search processing request to the SA management unit 610 based on information about an SA associated with the SP and packet information. The SA management unit 610, which has received the SA search processing request, checks whether an SA corresponding to the information about the SA associated with the designated SP and the packet information have been registered in the SAD, and notifies the IPSec protocol processing unit 612 of a search result.

In step S706, the IPSec protocol processing unit 612 makes a judgment the search result that has been notified from the SA management unit 610. If the corresponding SA exists (YES in step S706), the processing proceeds to step S707. If the relevant SA does not exist (NO in step S706), the processing proceeds to step S717.

In step S717, the IPSec processing unit 607 performs SA negotiation request processing.

Figure 8:
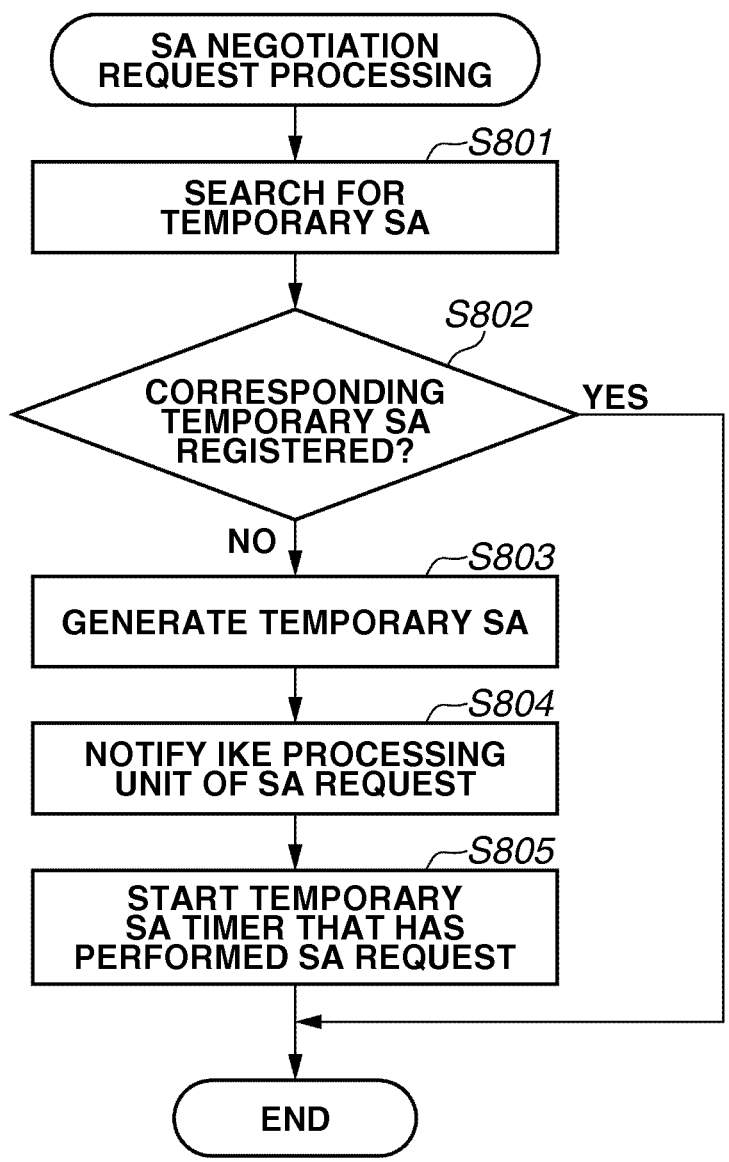
FIG. 8 is a flowchart implemented by the communication apparatus.

The SA negotiation request processing in step S717 will be described below with reference to FIG. 8.

The IPSec protocol processing unit 612 issues an SA negotiation request to the SP and SA table update management unit 611. In step S801, the SP and SA table update management unit 611 searches for a temporary SA to confirm whether an SA request has already been performed when it receives the SA negotiation request. The temporary SA is generated and retained when the SA request is performed, and is deleted when SA negotiation has been completed. If the SA request has not been completed even if a predetermined period of time has elapsed, a time-out occurs, to delete the temporary SA.

In step S802, the IPSec protocol processing unit 612 determines whether the relevant SA has been registered. If the temporary SA has been registered (YES in step S802) as a result of the search, it is determined that the SA request has already been performed, and the SA request is discarded. Then, the processing ends. If the temporary SA has not been registered (NO in step S802), the processing proceeds to step S803.

In step S803, the SP and SA table update management unit 611 generates and retains the temporary SA.

In step S804, the SP and SA table update management unit 611 notifies the IKE processing unit 606 of the SA request. The IKE processing unit 606 performs SA negotiation with the communication partner based on an IKE protocol when it receives the SA request.

In step S805, the SP and SA table update management unit 611 issues a timer processing request as to the temporary SA timer for which the SA request has been made, to the timer unit 613, and the processing ends.

When as to the temporary SA timer, a time-out has occurred, the timer unit 613 notifies the SP and SA table update management unit 611 to that effect. The SP and SA table update management unit 611, which has received the notification, deletes the temporary SA.

In step S718, the IPSec protocol processing unit 612 discards the requested transmitted packet, and the processing ends.

In step S707, the IPSec protocol processing unit 612 uses a specified SA, to process an IPSec protocol such as ESP or AH that has been designated as the SA. In step S708, the IPSec protocol processing unit 612 requests the encryption and authentication processing unit 608 to perform encryption and authentication processing in the IPSec protocol processing. When the encryption and authentication processing unit 608 receives the request, it performs the encryption and authentication processing based on SA information such as an encryption key and an encryption algorithm, and an authentication key and an authentication algorithm.

In step S709, the IPSec protocol processing unit 612 updates a count value of an expiration date in bytes of a used SA, and requests the SA management unit 610 to update the count value. The SA management unit 610 updates a byte number counter of the SA when it receives the request to update the count value.

In step S710, the IPSec protocol processing unit 612 confirms whether a software expiration date of the SA has passed. If the software expiration date has passed (YES in step S710), the processing proceeds to step S711. If the software expiration date has not passed or if the software expiration date has already passed (NO in step S710), the processing proceeds to step S712.

More specifically, if it is first determined in step S710 that the software expiration date of the SA has passed, the processing proceeds to step S711. If the software expiration date has not passed, the processing proceeds to step S712.

In step S711, the IPSec processing unit 607 performs SA negotiation request processing. The SA negotiation request processing in step S711 is similar to the SA negotiation request processing in step S717.

In step S712, the IPSec protocol processing unit 612 confirms whether a hardware expiration date of the SA has passed. If the hardware expiration date has passed (YES in step S712), the processing proceeds to step S713. If the hardware expiration date has not passed (NO in step S712), the processing proceeds to step S714.

In step S713, the IPSec protocol processing unit 612 notifies the SP and SA table update management unit 611 that the hardware expiration date has passed. The SP and SA table update management unit 611, which has received the notification that the hardware expiration date has passed, notifies the IKE processing unit 606 that the hardware expiration date has passed, and requests the SA management unit 610 to delete the SA. The SA management unit 610 deletes the SA from the SAD.

In step S714, the network protocol processing unit 604 performs IP protocol processing such as fragment processing and MAC header processing for an IPSec packet that has been subjected to IPSec processing by the IPSec processing unit 607. Then, the network protocol processing unit 604 issues a request to send the packet to the network interface unit 603.

In step S715, the network interface unit 603 sends the packet to a network, and the processing ends.

Figure 9:
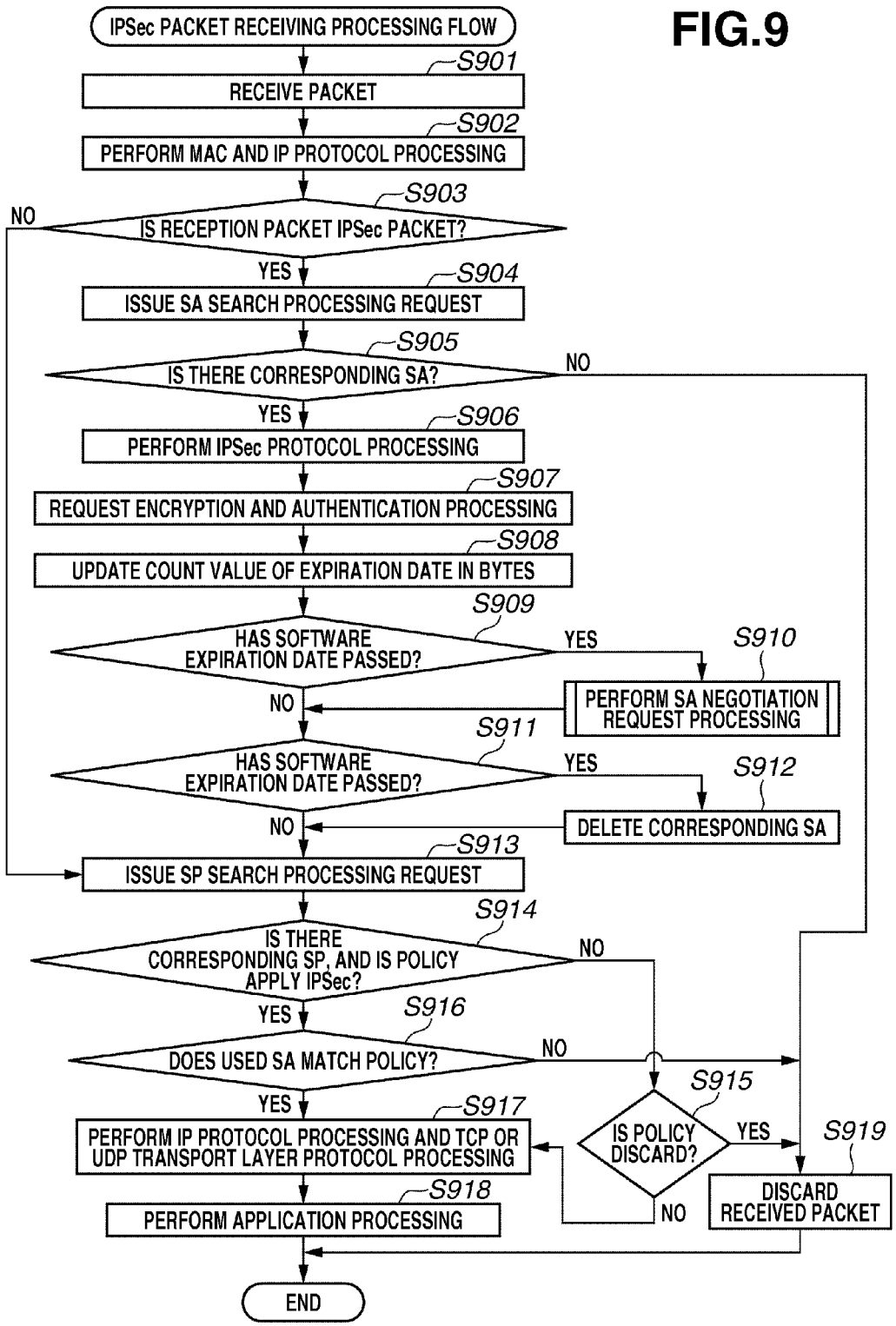
FIG. 9 is a flowchart implemented by the communication apparatus.

An IPSec packet receiving processing flow in the communication apparatus 101 will be described below with reference to FIG. 9. In step S901, the network interface unit 603 acquires, when it detects a received packet from the network, the received packet, and notifies the network protocol processing unit 604 of the acquired received packet.

In step S902, the network protocol processing unit 604 analyzes a header of the received packet, and performs MAC and IP protocol processing. In step S903, the network protocol processing unit 604 notifies the IPSec processing unit 607 of the received packet. When the IPSec processing unit 607 receives the received packet, the IPSec protocol processing unit 612 analyzes a header of the received packet, and determines whether the received packet is an IPSec packet. If the received packet is the IPSec packet (YES in step S903), the processing proceeds to step S904. If the received packet is not the IPSec packet (NO in step S903), the processing proceeds to step S913.

In step S904, the network protocol processing unit 604 issues an SA search processing request to the SA management unit 610 based on packet information such as an IP address, an IPSec protocol type, and an IPSec header of the received IPSec packet. The SA management unit 610, which has received the SA search processing request, makes a search to check whether an SA corresponding to packet information designated in the SAD has been registered, and notifies the IPSec protocol processing unit 612 of a search result.

In step S905, the IPSec protocol processing unit 612 makes a judgment on the search result, and determines whether the SA corresponding to the packet information has been found. If the corresponding SA has not been found (NO in step S905), the processing proceeds to step S919. If the corresponding SA has been found (YES in step S905), the processing proceeds to step S906.

In step S906, the IPSec protocol processing unit 612 processes an IPSec protocol such as ESP or AH using the SA obtained as a result of the search. In step S907, the IPSec protocol processing unit 612 requests the encryption and authentication processing unit 608 to perform encryption (decryption) and authentication processing in the IPSec protocol processing. The encryption and authentication processing unit 608 performs the encryption and authentication processing based on SA information such as an encryption key and an encryption algorithm and an authentication key and an authentication algorithm when it receives the request.

In step S908, the IPSec protocol processing unit 612 updates a count value of an expiration date in bytes of a used SA, and requests the SA management unit 610 to update the count value. The SA management unit 610 updates a byte number counter of the relevant SA when it receives the request to update the count value.

In step S909, the IPSec protocol processing unit 612 confirms whether a software expiration date of the SA has passed. If the software expiration date has passed (YES in step S909), the processing proceeds to step S910. If the software expiration date has not passed or if the software expiration date had already passed (NO in step S909), the processing proceeds to step S911.

In step S910, the IPSec processing unit 607 performs SA negotiation request processing. The SA negotiation request processing in step S910 is similar to the SA negotiation request processing in step S717.

In step S911, the IPSec protocol processing unit 612 confirms whether a hardware expiration date of the SA has passed. If the hardware expiration date has passed (YES in step S911), the processing proceeds to step S912. If the hardware expiration date has not passed (NO in step S911), the processing proceeds to step S913.

In step S912, the IPSec protocol processing unit 612 notifies the SP and SA table update management unit 611 that the hardware expiration date has passed. The SP and SA table update management unit 611, which has received the notification that the hardware expiration date has passed, notifies the IKE processing unit 606 that the hardware expiration date has passed, and requests the SA management unit 610 to delete the SA. The SA management unit 610 deletes the relevant SA from the SAD.

In step S913, the IPSec protocol processing unit 612 issues an SP search processing request to the SP management unit 609 based on packet information such as an IP address, a transport layer protocol type, and a port number of the received IP packet. The SP management unit 609, which has received the SP search processing request, makes a search to check whether an SP corresponding to the designated packet information has been registered in the SPD, and notifies the IPSec protocol processing unit 612 of a search result.

In step S914, the IPSec protocol processing unit 612 makes a judgment on the search result that has been notified from the SP management unit 609, and determines whether there is an SP corresponding to the designated packet information and a policy designated as the SP is Apply IPSec. If there is a corresponding SP and the policy is Apply IPSec (YES in step S914), the processing proceeds to step S916. If there is no corresponding SP or if the policy is other than Apply IPSec (NO in step S914), the processing proceeds to step S915.

If the SP has not been found (NO in step S914), then in step S716, the IPSec protocol processing unit 612 confirms a policy of an encryption communication processing apparatus, and determines whether the policy is Discard. If the policy is Discard (YES in step S915), then in step S919, the IPSec protocol processing unit 612 discards the packet, and the processing ends. If the policy is Bypass IPSec (NO in step S915), the processing proceeds to step S917. If the SP has been found in step S914, the IPSec protocol processing unit 612 confirms a policy of the SP. If the policy is other than Apply IPSec (NO in step S914), then in step S915, the IPSec protocol processing unit 612 determines whether the policy is Discard. If the policy is Discard (YES in step S915), then in step S919, the IPSec protocol processing unit 612 discards the packet, and the processing ends. If the policy is Bypass IPSec (NO in step S915), the processing proceeds to step S917.

In step S916, the IPSec protocol processing unit 612 determines whether the SA used in the policy designated as the SP matches a policy of the SA used in the IPSec protocol processing. If the used SA does not match the policy (NO in step S916), the processing proceeds to step S919. In step S919, the IPSec protocol processing unit 612 discards the packet, and the processing ends. If the used SA matches the policy (YES in step S916), the processing proceeds to step S917.

In step S917, the IPSec protocol processing unit 612 analyzes a header of an IP packet that has been subjected to IPSec processing, and processes an IP. The IPSec protocol processing unit 612 then analyzes a higher protocol header of the IP, and processes a transport layer protocol such as TCP or UDP. The IPSec processing unit 612 notifies the application processing unit 605 of the packet that has been subjected to the transport layer protocol processing.

In step S918, the application processing unit 605 performs application processing from the received packet. If the received packet is an IKE packet, the network protocol processing unit 604 notifies the IKE processing unit 606, to perform IKE protocol processing.

Figure 10:
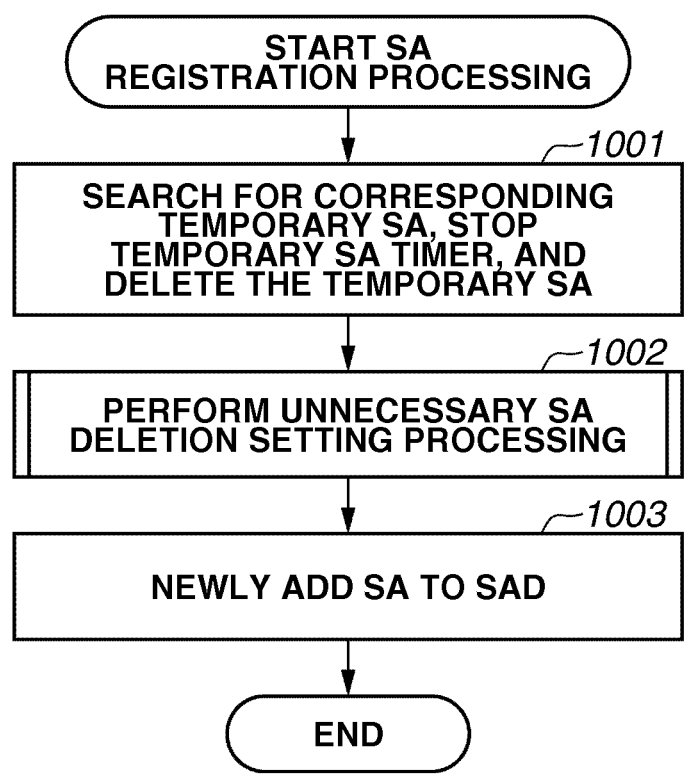
FIG. 10 is a flowchart implemented by the communication apparatus.

An SA registration processing flow in the IPSec processing unit 607 will be described below with reference to FIG. 10. In step S1001, the SP and SA table update management unit 611 makes a search to check whether there is a temporary SA corresponding to an SA to be registered. If there is a corresponding temporary SA (YES in step S1001), the SP and SA table update management unit 611 requests the timer unit 613 to stop a corresponding temporary SA timer, and then deletes the corresponding temporary SA. If there is no corresponding SA (NO in step S1001), the SP and SA table update management unit 611 does nothing.

In step S1002, the SP and SA table update management unit 611 performs unnecessary SA deletion setting processing.

Figure 11:
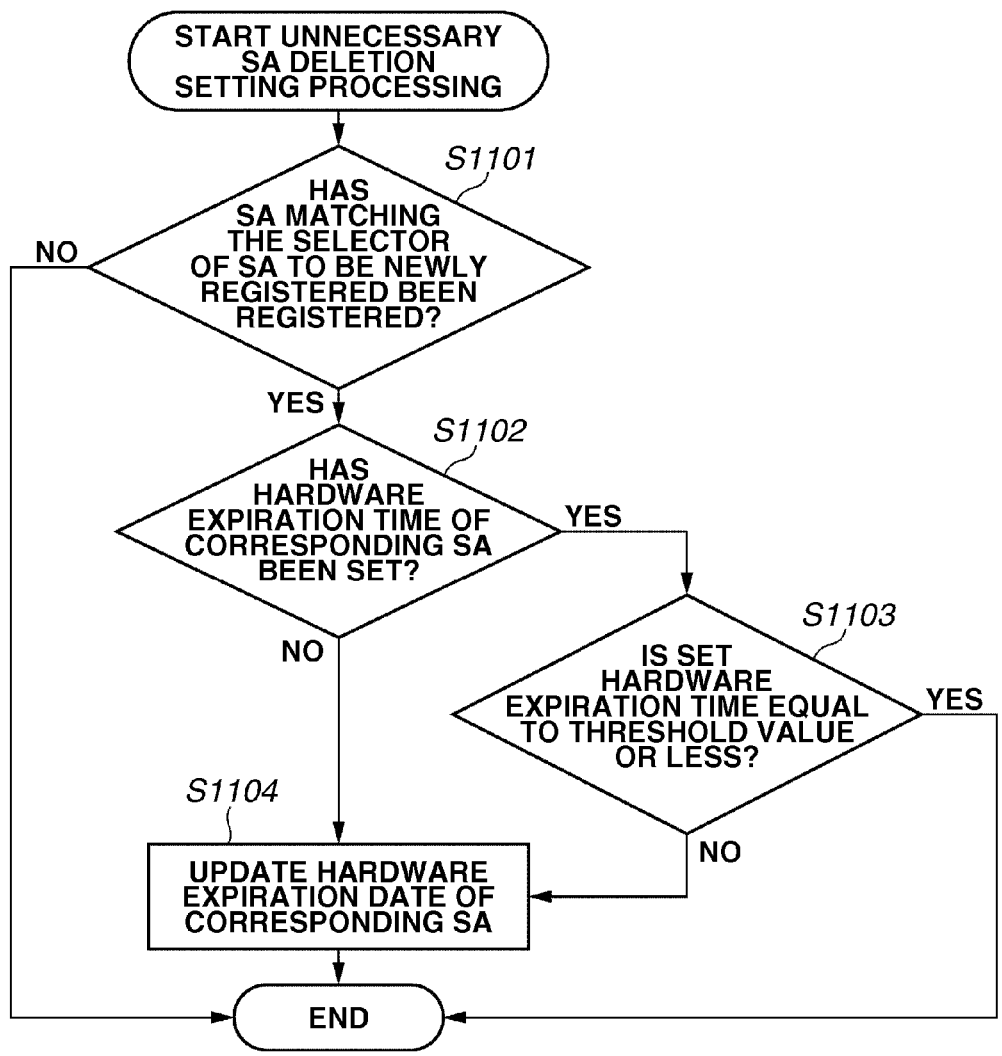
FIG. 11 is a flowchart implemented by the communication apparatus.

The unnecessary SA deletion setting processing in step S1002 will be described below with reference to FIG. 11.

In step S1101, the SP and SA table update management unit 611 performs an SA search request to examine whether an SA including a selector, which matches a selector in an SA to be newly registered, has been registered. The SA management unit 610 searches an SAD using the selector in the SA to be newly added, as a key, and notifies the SP and SA management unit 610 of a search result. In this case, the key includes an operation mode, an IP address of an own station, an IP address of a destination, a security protocol, and a state of an SA. Parameters other than the state of the SA are the same as those in the SA to be newly registered. The state of the SA is a state indicating whether a software expiration date has passed. The operation mode is either a transport mode used in an IPSec or a tunnel mode. If an SA including a selector, which matches the selector in the SA to be newly registered, has not been registered as a result of the search (NO in step S1101), the processing ends. If the SA has been registered (YES in step S1101), the processing proceeds to step S1102.

In step S1102, the IPSec protocol processing unit 612 confirms whether a hardware expiration date time of the SA, which has been found as a result of the search, has been set. If the hardware expiration date time has not been set (NO in step S1102), the processing proceeds to step S1104. If the hardware expiration date time has been set (YES in step S1102), the processing proceeds to step S1103. Alternatively, the processing may proceed to step S1104 without performing the determination processing in step S1102. In this case, the hardware expiration date time is forcibly set regardless of whether the hardware expiration date time has been set.

In step S1103, the SP and SA table update management unit 611 determines whether the set hardware expiration date time is a threshold value or less. If the hardware expiration date time is the threshold value or less (YES in step S1103), the unnecessary SA deletion setting processing ends. If the hardware expiration date is not the threshold value or less (NO in step S1103), the processing proceeds to step S1104. The threshold value is a preset value (predetermined time) previously determined in a system. The threshold value may be a Round-Trip Time (RTT) separately measured using a TCP or an Internet Control Message Protocol (ICMP). Alternatively, the threshold value may be a period of time that elapses until a rekeyed SA is registered after the software expiration date of the SA has passed. The threshold value may be any value which is appropriate when comparison with the hardware expiration date time is made.

If the hardware expiration date time is set without performing the determination processing in step S1103, the unnecessary SA deletion setting processing may directly end.

In step S1104, the SP and SA table update management unit 611 updates the hardware expiration date of the SA which has passed the software expiration date, and the unnecessary SA deletion setting processing ends. Either value indicated as the threshold value in step S1103 is used as a value at the time of the updating. This value may be the same as or different from the value that has been compared in step S1103. The hardware expiration date of the SA, to which the hardware expiration date time has been set, comes to pass through the processing of the SA management unit 610 and the timer unit 613. The SP and SA table update management unit 611 is then notified that the hardware expiration date of the SA has passed. The SP and SA table update management unit 611 issues an SA deletion request to the SA management unit 610, and the SA management unit 610 deletes the SA from the SAD. In the processing in step S1104, the SP and SA table update management unit 611 sets the hardware expiration date time, to detect that the hardware expiration date has passed through the processing of the SA management unit 610 and the timer unit 613. However, the SP and SA table update management unit 611 may set an unnecessary SA deletion timer and perform a deletion request.

In step S1103, the SP and SA table update management unit 611 issues a request to add a new SA to the SA management unit 610. The SA management unit 610 registers the new SA when it receives the new SA addition request, and the processing ends.

According to the present exemplary embodiment, when an SA is registered, it is determined whether an SA including the same sector is included which has passed a software expiration date, and unnecessary SA deletion setting processing is performed so that the SA which has passed the software expiration date can be deleted. Thus, a memory resource can be prevented from being compressed by the unnecessary SA. Further, a packet which is originally receivable can be prevented from being lost. Thus, the packet using the SA which has passed the software expiration date is not discarded while retaining the SA of the software which has passed expiration date for a predetermined period of time. Further, the SA which has passed the software expiration date can be prevented from remaining for quite a while due to erroneous setting by a user. Furthermore, the SA which has passed the software expiration date can be deleted without depending on an SA deletion message from a communication partner. Even if an IKE packet is lost on a network, for example, the SA can appropriately be deleted. Further, the unnecessary SA can appropriately be deleted, so that a load imposed in searching an SAD when an IPSec packet is sent or received can also be reduced.

The above-mentioned exemplary embodiments may be combined. For example, if a hardware expiration date time of an old SA may be set, like in the second exemplary embodiment and a packet using the new SA is received from a partner, like in the first exemplary embodiment, an old SA associated with a new SA may be deleted.

Further, by use of a program for causing a computer to implement the above-mentioned flowcharts and a storage medium storing the program, a similar function and effect can be obtained.

According to the present invention, when a key to be used to decrypt or authenticate a packet is updated from a first key to a second key, the first key is deleted upon receipt of a packet to be decrypted or authenticated using the second key. Thus, a memory can be effectively used while a processing load can be reduced.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-008621 filed Jan. 21, 2013, which is hereby incorporated by reference herein in its entirety.

What is claimed is:

1. A communication apparatus comprising:
a storage unit configured to store a first key used to decrypt or authenticate a packet to be communicated between the communication apparatus and an other communication apparatus;
an updating unit configured to update the first key to a second key different from the first key when a term of validity of the first key has passed;
a determination unit configured to determine whether a packet, which is to be decrypted or authenticated using the second key, has been received by the communication apparatus from the other communication apparatus; and
a deletion unit configured to delete the first key from the storage unit according to timing when the determination unit determines that the packet, which is to be decrypted or authenticated using the second key, has been received from the other communication apparatus,
wherein at least one of the updating unit, the determination unit, and the deletion unit is realized by a processor configured to read a program stored in a memory and execute the program.

2. The communication apparatus according to claim 1, wherein the first key and the second key are used to decrypt or authenticate an Internet Protocol (IP) packet conforming to a Security Architecture for Internet Protocol (IPSec).

3. The communication apparatus according to claim 1, wherein the updating unit updates the first key to the second key using an Internet Key Exchange (IKE).

4. The communication apparatus according to claim 1, wherein the packet conforms to an Internet Protocol (IP).

5. The communication apparatus according to claim 1, wherein the first key and the second key are used in a Security Association (SA) conforming to a Security Architecture for Internet Protocol (IPSec).

6. The communication apparatus according to claim 1, wherein the determination unit determines that the packet, which is to be decrypted or authenticated using the second key, has been received from the other communication apparatus based on a Security Pointer Index (SPI).

7. The communication apparatus according to claim 1, wherein a term of validity of the first key and a term of validity of the second key are set based on a communication result between the communication apparatus and the other communication apparatus.

8. The communication apparatus according to claim 1, wherein
the storage unit stores the first key by associating the second key, and
the deletion unit deletes the first key associated with the second key from the storage unit in response to the determination unit determining that the packet, which is to be decrypted or authenticated using the second key, has been received from the other communication apparatus.

9. The communication apparatus according to claim 1, wherein
the storage unit stores a third key used to encrypt a packet to be sent to the other communication apparatus,
the updating unit updates the third key to a fourth key when a term of validity of the third key has passed,
the determination unit determines that a packet encrypted using the fourth key is sent to the other communication apparatus, and
the deletion unit deletes the third key from the storage unit according to the timing when the determination unit determines that the packet, encrypted using the fourth key, is sent to the other communication apparatus.

10. The communication apparatus according to claim 1, wherein
the storage unit stores a third key used to encrypt a packet to be sent to the other communication apparatus,
the updating unit updates the third key to a fourth key when a term of validity of the third key has passed, and
the deletion unit deletes the third key from the storage unit according to the timing when the updating unit updates the third key to the fourth key.

11. The communication apparatus according to claim 1, wherein the first key and the second key are encryption keys used to decrypt a packet to be communicated between the communication apparatus and the other communication apparatus.

12. The communication apparatus according to claim 1, wherein the first key and the second key are authentication keys used to authenticate the packet to be communicated between the communication apparatus and the other communication apparatus.

13. A communication apparatus comprising:
a storage unit configured to store a first encryption key used to decrypt a packet to be communicated between the communication apparatus and an other communication apparatus;
an updating unit configured to update the first encryption key to a second encryption key when a term of validity of the first encryption key has passed;
a determination unit configured to determine, after the first encryption key is updated by the updating unit to the second encryption key, whether the first encryption key is not set to be deleted before a first predetermined period of time elapses; and
a deletion unit configured to delete, in response to the determination unit determining that the first encryption key is not set to be deleted before the first predetermined period of time elapses, the stored first encryption key when a second predetermined period of time, which is shorter than the first predetermined period of time, has elapsed since the first encryption key is updated to the second encryption key, wherein at least one of the updating unit, the determination unit, and the deletion unit is realized by a processor configured to read a program stored in a memory and execute the program.

14. The communication apparatus according to claim 13, further comprising a timer configured to measure a time until the second predetermined period of time elapses after the first encryption key is updated to the second encryption key,
wherein the deletion unit deletes the first encryption key when the timer measures the second predetermined period of time.

15. The communication apparatus according to claim 13, further comprising a measurement unit configured to measure a Round-Trip Time (RTT) between the communication apparatus and the other communication apparatus,
wherein the second predetermined period of time is the RTT measured by the measurement unit.

16. A method for controlling a communication apparatus, the method comprising:
storing a first key used to decrypt or authenticate a packet to be communicated between the communication apparatus and an other communication apparatus;
updating the first key to a second key different from the first key when a term of validity of the first key has passed;
determining, using a processor configured to read a program stored in a memory and execute the program, whether a packet, which is to be decrypted or authenticated using the second key, has been received by the communication apparatus from the other communication apparatus; and
deleting the stored first key according to timing when it is determined that the packet, which is to be decrypted or authenticated using the second key, has been received from the other communication apparatus.

17. A method for controlling a communication apparatus, the method comprising:
storing a first encryption key used to decrypt a packet to be communicated between the communication apparatus and an other communication apparatus;
updating the first encryption key to a second encryption key when a term of validity of the first encryption key has passed;
determining, using a processor configured to read a program stored in a memory and execute the program and after the first encryption key is updated to the second encryption key, whether the first encryption key is not set to be deleted before a first predetermined period of time elapses; and
deleting, in response to determining that the first encryption key is not set to be deleted before the first predetermined period of time elapses, the stored first encryption key when a second predetermined period of time, which is shorter than the first predetermined period of time, has elapsed since the first encryption key is updated to the second encryption key.

18. A non-transitory computer-readable storage medium storing a program to cause a computer to perform a method for controlling a communication apparatus, the method comprising:
storing a first key used to decrypt or authenticate a packet to be communicated between the communication apparatus and an other communication apparatus;
updating the first key to a second key different from the first key when a term of validity of the first key has passed;
determining, using a processor configured to read a program stored in a memory and execute the program, whether a packet, which is to be decrypted or authenticated using the second key, has been received by the communication apparatus from the other communication apparatus; and
deleting the stored first key according to timing when it is determined that the packet, which is to be decrypted or authenticated using the second key, has been received from the other communication apparatus.

19. A non-transitory computer-readable storage medium storing a program to cause a computer to perform a method for controlling a communication apparatus, the method comprising:
storing a first encryption key used to decrypt a packet to be communicated between the communication apparatus and an other communication apparatus;
updating the first encryption key to a second encryption key when a term of validity of the first encryption key has passed;
determining, using a processor configured to read a program stored in a memory and execute the program and after the first encryption key is updated to the second encryption key, whether the first encryption key is not set to be deleted before a first predetermined period of time elapses; and
deleting, in response to determining that the first encryption key is not set to be deleted before the first predetermined period of time elapses, the stored first encryption key when a second predetermined period of time, which is shorter than the first predetermined period of time, has elapsed since the first encryption key is updated to the second encryption key.

20. The communication apparatus according to claim 1, wherein the deletion unit deletes the first key from the storage in response to the determination unit determining that the packet, which is to be decrypted or authenticated using the second key, has been received from the other communication apparatus.

21. The communication apparatus according to claim 9, wherein the deletion unit deletes the third key from the storage in response to the determination unit determining that the packet, encrypted using the fourth key, is sent to the third communication apparatus.

* * * * *